United States Patent [19]

Tisma

[11] Patent Number: 4,982,556
[45] Date of Patent: Jan. 8, 1991

[54] MODULARLY CONSTRUCTED AUTOMATIC PACKAGING MACHINE

[75] Inventor: Steven Tisma, Chicago, Ill.

[73] Assignee: Tisma Machine Corporation, Chicago, Ill.

[21] Appl. No.: 431,378

[22] Filed: Nov. 3, 1989

Related U.S. Application Data

[63] Continuation-in-part of Ser. No. 349,224, May 9, 1989, which is a continuation-in-part of Ser. No. 164,010, Mar. 4, 1988, Pat. No. 4,856,566.

[51] Int. Cl.⁵ ............... B65B 57/06; B65B 57/14; B65B 5/06; B65B 39/14
[52] U.S. Cl. ............... 53/506; 53/154; 53/247; 53/251; 53/252; 53/255; 198/477.1; 198/575; 198/576; 198/803.01; 198/860.1
[58] Field of Search ............ 53/493, 55, 154, 237, 53/247, 251, 252, 255, 506; 141/142; 198/803.01, 803.1, 803.11, 473.1, 477.1, 575, 576, 834, 860.1, 860.3

[56] References Cited

U.S. PATENT DOCUMENTS

| | | | |
|---|---|---|---|
| 2,642,212 | 6/1953 | Currivan | 53/252 |
| 2,651,442 | 9/1953 | Malhiot | 53/252 |
| 2,829,478 | 4/1958 | Engleson et al. | 53/252 X |
| 2,934,869 | 5/1960 | Engleson et al. | 53/252 X |
| 3,027,699 | 4/1962 | Miller et al. | 53/251 X |
| 3,214,007 | 10/1965 | Matthies et al. | 198/834 X |
| 3,288,271 | 11/1966 | Burford | 198/803.11 |
| 3,292,772 | 12/1966 | Rice | 198/834 X |
| 3,821,874 | 7/1974 | Jones | 53/252 X |
| 3,906,705 | 9/1975 | Beck et al. | 53/252 |
| 3,994,321 | 11/1976 | Eisenberg | 53/237 X |
| 4,122,939 | 10/1978 | Langen | 198/728 X |
| 4,248,027 | 2/1981 | Cleary et al. | 53/251 X |
| 4,509,309 | 4/1985 | Langen et al. | 53/237 X |
| 4,514,964 | 5/1985 | Langen | 53/252 X |
| 4,629,058 | 12/1986 | Reissman et al. | 198/575 X |
| 4,641,583 | 2/1987 | Harrington | 198/803.01 X |
| 4,643,296 | 2/1987 | Braun et al. | 198/860.3 X |
| 4,680,920 | 7/1987 | Veré et al. | 53/251 X |
| 4,716,714 | 1/1988 | Tisma | 53/251 X |
| 4,829,751 | 5/1989 | Tisma | 198/803.01 X |
| 4,856,566 | 8/1989 | Tisma | 141/142 |
| 4,870,799 | 10/1989 | Bergerioux et al. | 53/154 X |

Primary Examiner—Horace M. Culver
Attorney, Agent, or Firm—Laff, Whitesel, Conte & Saret

[57] ABSTRACT

An automatic packaging machine is custom constructed from standardized modules in order to reduce cost and standardize operational and maintenance procedures. The standardized modules include conveyor chain modules which may be ganged to maintain synchronization of operations. Various types of attached may be attached to the conveyor chain in order to mandrels adapt the machine to load different types of products. A cam pin guides and directs selective transfers of products when both box and product are present and to cancel transfer when one of said box or product is absent. One example of such a customized machine is a machine for loading golf balls.

23 Claims, 8 Drawing Sheets

MODULARLY CONSTRUCTED AUTOMATIC PACKAGING MACHINE

This is a continuation-in-part of Ser. No. 07/349,224, filed May 1989, which in turn was a continuation-in-part of Ser. No. 07,164,010, filed Mar. 4, 1988, now U.S. Pat. No. 4,856,566.

This invention relates to automatic packaging machines and more particularly to automatically controlled and modularly constructed packaging machines.

Automatic packaging machines are used for many purposes such as inserting almost anything, such as candy, food, small parts, and the like, into boxes, bags, or the like. Each product has its own peculiar characteristics and packaging needs. For example, some candy may be a hand full of small items (such as peanuts, for example) which are poured into a box. The food might be a pie which is boxed prior to freezing. Small parts might be pencils, felt tipped markers, golf balls, or almost anything else which can be boxed.

Many times there may be special packaging considerations and problems. For example, a box may have two or three compartments for separating products, such as powdered coffee, sugar, and powdered coffee whitener. Then the problem is to fill each compartment without over flow into adjacent compartments. Food problems pose severe sanitation constraints requiring a frequent cleaning of machines. Golf balls may be packed, two, three, or four to a box, and each box must contain only balls carrying one of four numbers. The list of special problems and considerations could go on.

Each of these and many other packaging considerations and needs presents a number of different problems. Therefore, the practice heretofore has been to design an entirely new and completely custom made machine for packaging each product. This is expensive from all view points since it requires custom engineering and production by the company manufacturing the automatic packaging machine. Maintenance, spare parts, and the like must also be provided on a custom basis. Workers, operators, maintenance and other support people often have to learn new skills for almost every machine installed in a plant.

Another consideration is the controls for such a machine. If every machine has its own peculiar construction and operating sequence, procedures, and the like, the control circuits are also custom designed. This tends to defeat the concept that a packaging machine should be controlled by a computer or other automatic control system. Even when such computerized automatic controls are built into a customized packaging machine, the operator's knowledge is dedicated to that machine. Therefore, if a busy packaging company or department has a number of different machines, it is unlikely that a single operator could operate all machines without a substantial amount of special training for each machine. Also, it is unlikely that an employee with the office type of skills required to run a computer could also service and maintain the packaging machine.

For these and many other reasons, it is desirable to provide as much commonality as possible between automatic packaging machines. This means that a desirable machine would be assembled from standard modules which could be put together in different configurations in order to serve the different packaging needs of different products. If they are standard modules, common compatible control circuits could be readily adapted to the needs of many different machines. One operator should then be able to control many different machines.

Accordingly an object of this invention is to provide new and novel means for and methods of constructing automatic packaging machines. Here, an object is to provide a modular type of construction which may be assembled in a plurality of different configurations in order to provide different forms of automatic packing machines.

A further object of this invention is to provide automatic packaging machines which may be adaptable to any of many different configurations, but which lend themselves to common control techniques so that all may be computer controlled in a substantially similar manner. Here an object is to provide a plurality of machines having the ability to respond to common software which may be used in control computers of many different packaging machine.

In keeping with an aspect of this invention, these and other objects are accomplished by a use of a basic conveyor chain module which may be made in any of many of different standard sizes and assembled into different conveyor configurations. These chain modules may be adapted to transport different types of standardized mandrels for carrying different kinds of products to many work stations where product is dumped into mandrels and then the contents of the mandrels are dumped into boxes, for example. Two position, indexing cam pins may be used to provide a coordination between the positions of the mandrels and the work stations along the paths followed by the mandrels.

Figures 1, 2A, 2B:
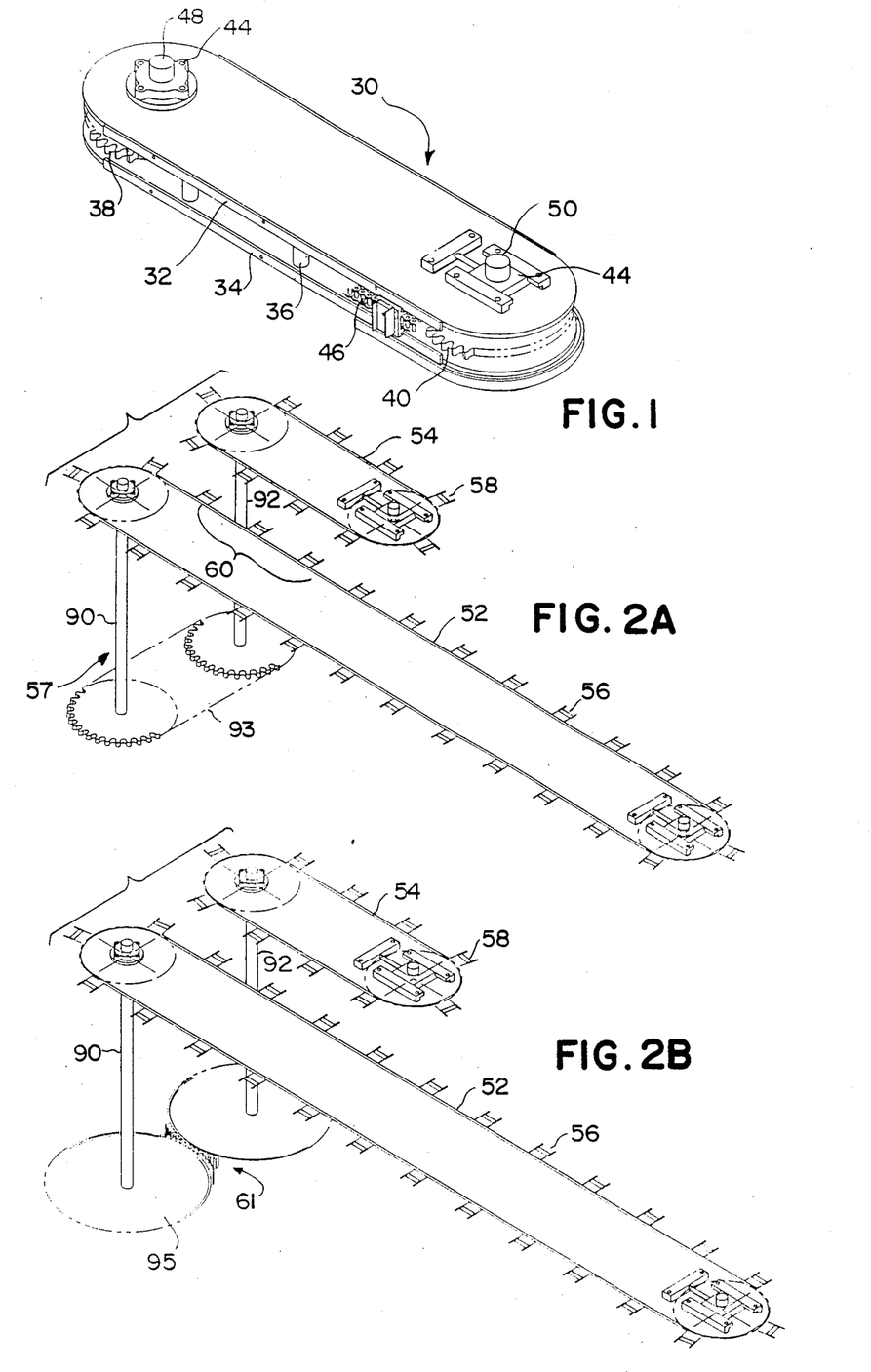
FIG. 1 is a perspective view of a chain module which may be used in an automatic packaging machine.

Preferred embodiments of the invention may be understood from the attached drawings, in which:

FIGS. 2–7 are exemplary schematic diagrams illustrating how various numbers and sizes of the chain module of FIG. 1 may be laid out and assembled to make different customized conveyors for automatic packaging machines;

FIG. 1 shows a link chain module 30 which may be used as a conveyor in a automatic packaging machine. This same module design may be used in any of many different standardized sizes and may be assembled in many different configurations.

The major components of the chain module are a pair of spaced parallel plates 32, 34 which are bolted to each other as at 36, to form a rigid structure. At each end of the plates, and positioned between them are two journal mounted, sprocket wheels 38, 40. Suitable bearings 44 are secured to the plates 32, 34 in order to rotatably mount each of the sprocket 38, 40 wheels between the two plates 32, 34. An endless link-chain 46 is trained over the two sprocket wheels 38, 40. Drive shafts, such as 48, 50, may be attached to either or both of the sprocket wheels in order to either drive them or transfer driving energy between chain modules and, perhaps, other mechanisms associated with the modules. 30

FIGS. 2-7 schematically illustrate a number of different exemplary layouts for the chain modules 30. More specifically, preferably there are several lengths of the chain modules 30. Thus, for example, two short modules may be placed beside one long module, with one short module shaft 48 driving one module and the other shaft 50 driving the other modules. This arrangement locks the movement of all modules in a single timing program. The modules may be positioned with the sprocket wheels in either a vertical orientation or a horizontal orientation. Of course there may be as many other layouts as the mind can contemplate.

In greater detail, FIGS. 2A, 2B shows a simple packaging machine having two horizontally oriented chain modules 52, 54. In this simple orientation, boxes might be carried by mandrels 56 attached to chain module conveyor 52 while product is carried by mandrels 58 attached to chain module 54, for example. The product is transferred into the boxes in area 60 where mandrels carried by the two chain modules confront each other. Chain module 54 is here shown shorter than module 56 since more work stations are required to form, fill, close, seal, and deliver boxes as compared to the number of work stations required to pick up and dump product into the boxes. Thus, long chain module 52 passes many work stations. Short chain module 54 passes a few stations. FIG. 2A shows two modules driven in synchronism by a common link chain 57. FIG. 2B shows gears 61 as a similar synchronizing drive.

Figures 3, 4, 5:
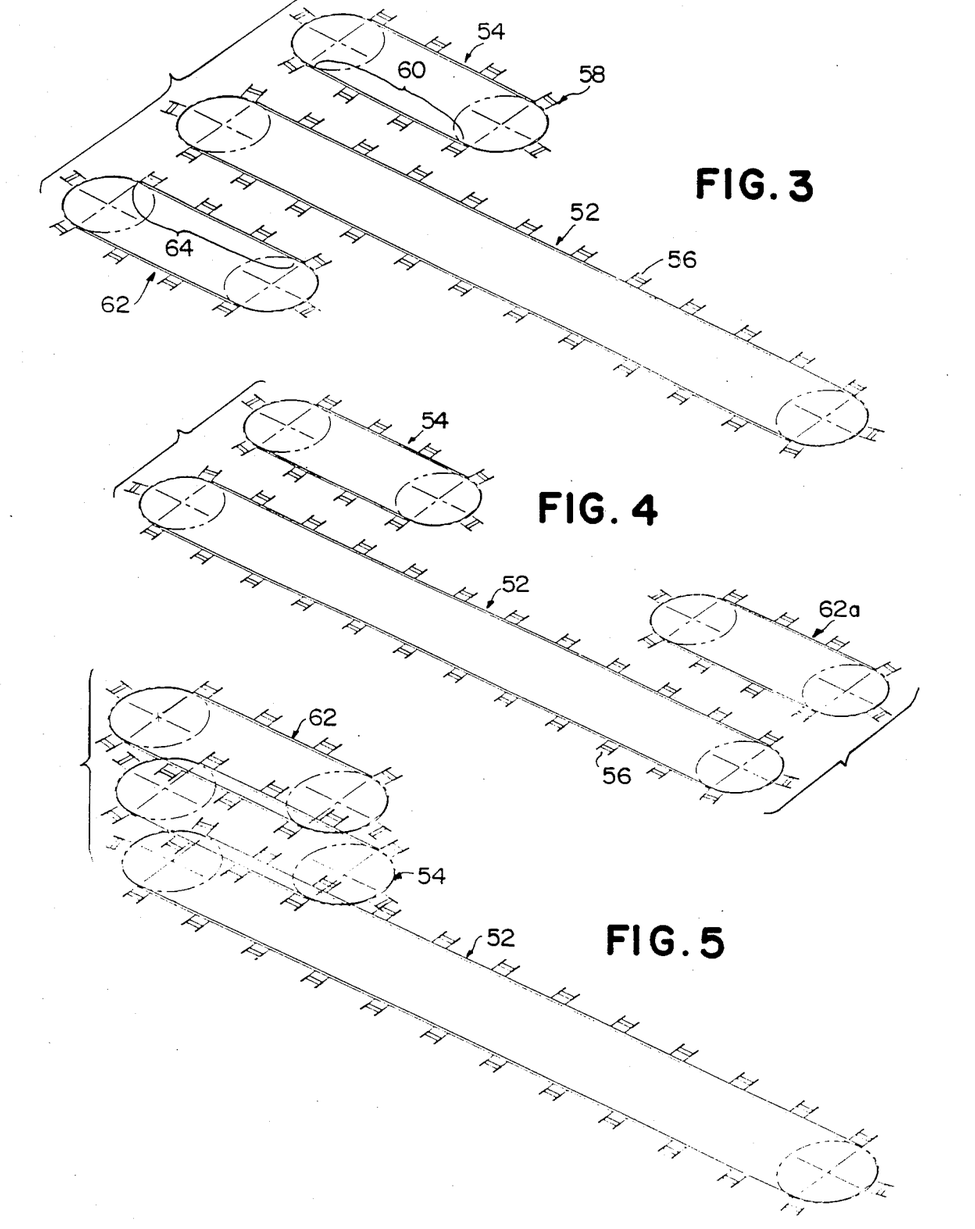

In FIG. 3, a third chain module conveyor 62 confronts the long-chain module 52 in area 64 on a side opposite chain module 54 in order to perform a second function. For example, each box carried in a mandrel 56 may have two compartments. One product may be dumped into one compartment in area 64. A second product may be dumped into a second compartment in area 60. Or, the long chain module 52 may be driven twice as fast if every other box in a mandrel 56 is filled in area 64 and the remaining boxes are filled in area 60.

In FIG. 4, the second chain module 62a and first module 54 are on the same side of the long box carrying chain module 52. This configuration might be best for the convenience of a work force or to fit into a specific floor area. Or, for some other reason such as to accommodate different time requirements, it might be preferable to prepare the boxes in mandrels 56 as they travel a short distance between work stations at modules 54 and 62 on the far side of module 52, as compared to forming to the boxes while mandrels 56 travel from modules 62 to module 54 over the long path on the near side of module 52.

In FIG. 5, the chain modules 52, 54, 62 are stacked vertically to perform still other functions. For example, work stations for doling out measured quantities of product (such as peanuts) may be associated with chain modules 62, funnels might be associated with chain module 54, and boxes might be associated with chain module 52. Thus, in such a case, the measured quantity of peanuts may be poured from a mandrel on chain 62, and through a funnel on chain 54, into a box on claim 52.

Figure 6:
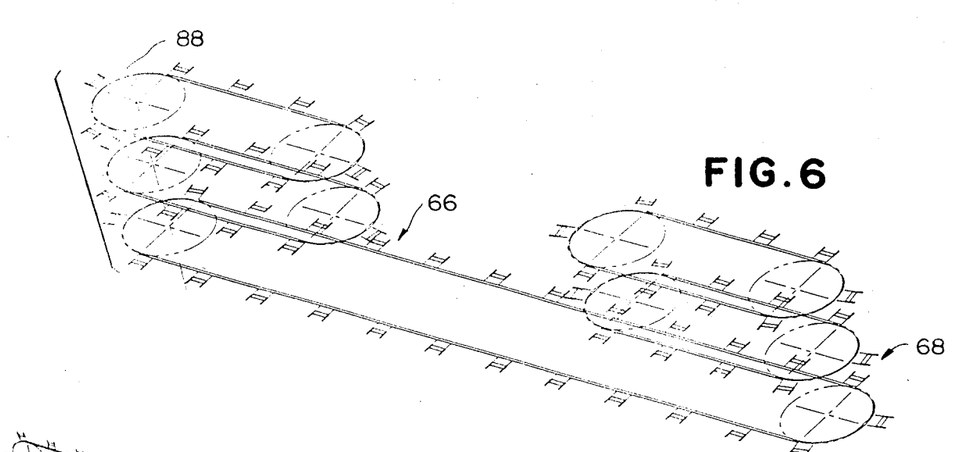

In FIG. 6, the stack of chain modules 66 is repeated on end 68, in order to provide a more complex packaging function. This is somewhat similar to the duplication of chain modules shown by FIGS. 2 and 3. Perhaps, it is to double the packaging speed by filling boxes from two locations, or to put two products in one box.

Figure 7:
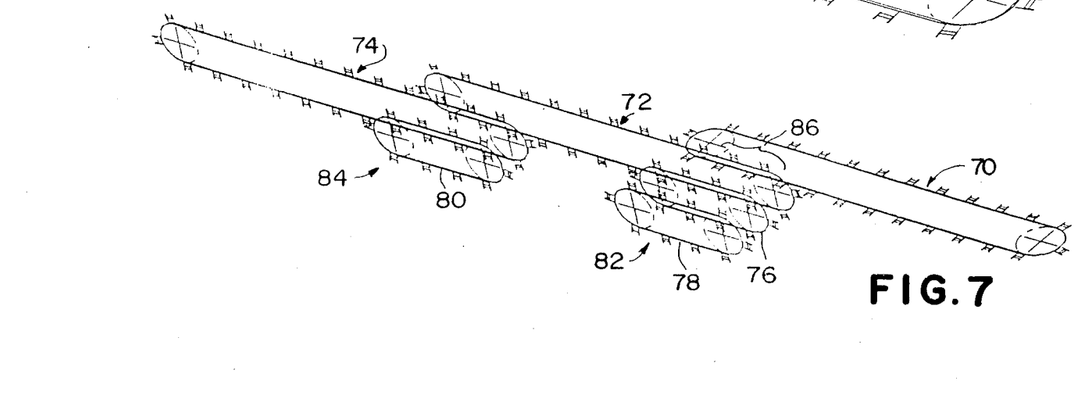

FIG. 7 shows a still more complex arrangement of chain conveyors. Here, one long chain module 70 is shown in a horizontal orientation while two long chain modules 72, 74 and three short chain modules 76-78 are in a vertical orientation. In this orientation, product may be carried by some and pushers by other of the vertical chain modules 72-80. The product is assembled in two areas 82, 84 and deposited in mandrels on chain 72. The boxes may be carried by the horizontal module 70. In the confrontation area 86, the assembled product might be pushed from mandrels on chain module 72 into the boxes on the chain module 70.

The examples of how various chain modules may be assembled could be multiplied, almost endlessly. In some cases, the shafts on the various modules may be a single common shaft passing through several modules. For example, all of the modules at 66 (FIG. 6) may be driven by a single common shaft 88. Some of the other chain modules may be driven by separate shafts, as at 90, 92 (FIG. 2) which are coupled together by chains 93 (FIG. 2A) or gears 95 (FIG. 2B) so that one shaft is driven as the slave of the other. In the more complex forms (such as FIG. 7), the driving force may be applied via a combination of shafts, some of which are common shafts and other of which are master/slave drives. A single motor may thus synchronously drive all of the chains in a single timing schedule, by a use of a common linkage.

In FIGS. 2-7 various mandrels are shown by a symbol which appears some what similar to the letter "H" (as at 56, FIG. 2, for example).

Figures 8, 9, 10:
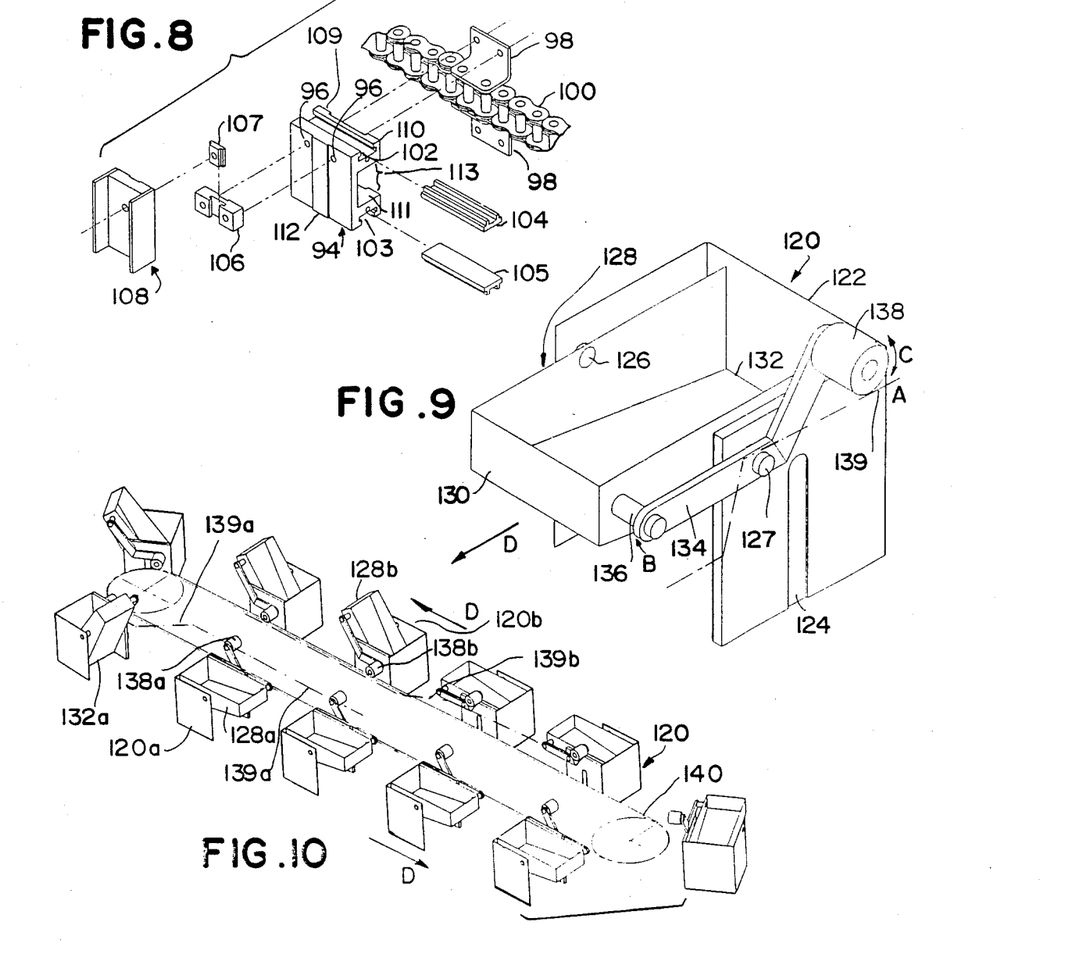
FIG. 8 is a perspective view of a connector module which may be bolted to a chain conveyor.
FIG. 9 is a perspective view of a first standardized mandrel which may be attached to the connector of FIG. 8.
FIG. 10 schematically shows a conveyor chain module with a plurality of the mandrels of FIG. 9 attached thereto.

An important connector part for attaching this mandrel to a conveyor chain is seen in FIG. 8. A single piece of metal 94 may be either a machined or die cast part, for example. Bolt holes 96 enable the part 94 to be bolted to mounting brackets 98 on the link chain conveyor 100. The part 94 includes upper and lower T-shaped slots 102, 103, into which nylon tracks 104, 105 slide in order to ride on rails (not shown) adjacent conveyor chain 100. A mating coupler 106, 107 is provided to enable any suitable mandrel 108 to be slipped into and then latched in place. Various embossments 109, 110, 111, 112 and guideway 113 are provided to index and maintain a proper position alignment between the conveyor chain 100, connectors 106, 107 and mandrel 108. Therefore, the mandrel may be attached to or removed from the conveyor chain 100 quickly, and easily. Accordingly, each of the "H" shaped symbols (as at 56, FIG. 2) in FIGS. 2-7 may be construed as being any "suitable mandrel".

FIG. 9 shows a first mandrel 120 which is adapted to pick up product at one point and dump that product at a given location (such as in a box) along a path followed by a chain module conveyor. In greater detail, a first part of mandrel 120 is a somewhat U-shaped wall 122 having a depression 124 in one side wall for receiving an embossment, such as 112, on the FIG. 8 connector for aligning the mandrel relative to the chain. Thus, this U-shaped wall 122 is attached to travel with a conveyor chain.

Inside and pivotally attached at 126, 127 to the U-shaped wall 122 is a tray 128 which is adapted to normally ride in an approximately a horizontal position. The back 130 of tray 128 is a little lower than the front 132 so that product will not spill while it is being carried in the tray.

Also rotatably attached at 126 is an actuator arm 134 which is attached at one end (point 136) to an end of tray 128. A roller 138 is attached to the opposite end of arm 134 in order to roll along and to be moved up and down by a suitable cam 139 which parallels the conveyor chain. Therefore, if the actuator arm roller 138 moves down (direction A), the back end 130 of tray 128 moves up (direction B) to tip the tray 128 around axis 126, 127. This downward dumping moves the product out of the tray 128. When the actuator arm roller 138 moves up (direction C), tray 128 pivots around axis 126, 127 to return to the normal horizontal, product carrying position shown in FIG. 9.

A suitable cam plate 139 positioned along the path followed by a conveyor chain has a profile for moving roller 138 up or down and thus for tipping the tray 128. As drawn, cam plate 139 is about to lower roller 138, in order to raise point 136 and dump the tray 128 (assuming conveyor travel in direction D).

FIG. 10 illustrates how a plurality of the modules 120 of FIG. 9 may be carried by a conveyor chain 140. Beginning at position 120a the modules trays 128a are in a horizontal position 25 to receive and carry product. At this point a profile 139a of cam 139 is relatively high, to support roller 138a in a high position, this forcing the tray 128a into a horizontal position. As the modules 120 travel in direction D, they receive and carry product.

In position 120b, the profile 139b of the cam 139 is lower to a level which lowers the roller 138b, tipping tray 128b downwardly, thereby dumping product into a box (not shown) which is beneath the front end 132a. The low profile 139b continues to hold the tray 128b in a tipped position until the mandrel returns 5 to position 120a, where the cam profile 139a goes to a high level returning the tray to the horizontal product carrying position. The tray 128 remains tipped for period of time which is adequate to enable a full charge of the product to fall into a box.

FIGS. 11-14 show a different kind of mandrel 150 which is adapted to load a product such as golf or tennis balls into a can or box, for example. The box may be of a size to contain two, three, or four balls.

Here, an end plate 152 is adapted at 153 (FIG. 12) to be clamped to the chain conveyor 155 via a coupler such as that shown in FIG. 8. Two side plates 154, 156 (FIG. 11) are bolted to the end plate 152. Pivotally mounted between the sides plates at 158, 160 is an elongated mandrel tray 161 for receiving product. Normally, conveyor chain 155 (FIG. 12) carries the mandrel tray in a horizontal position as shown at 150a. For example, a selected number (two, three or four) of golf balls may be deposited in or carried by each horizontal tray 150.

Figure 11:
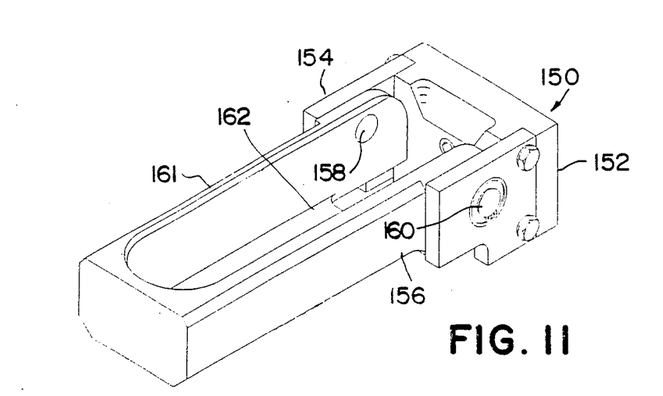
FIG. 11 is a perspective view of a second mandrel which may be attached to a conveyor chain in order to load a different kind of product.
Figures 12, 13:
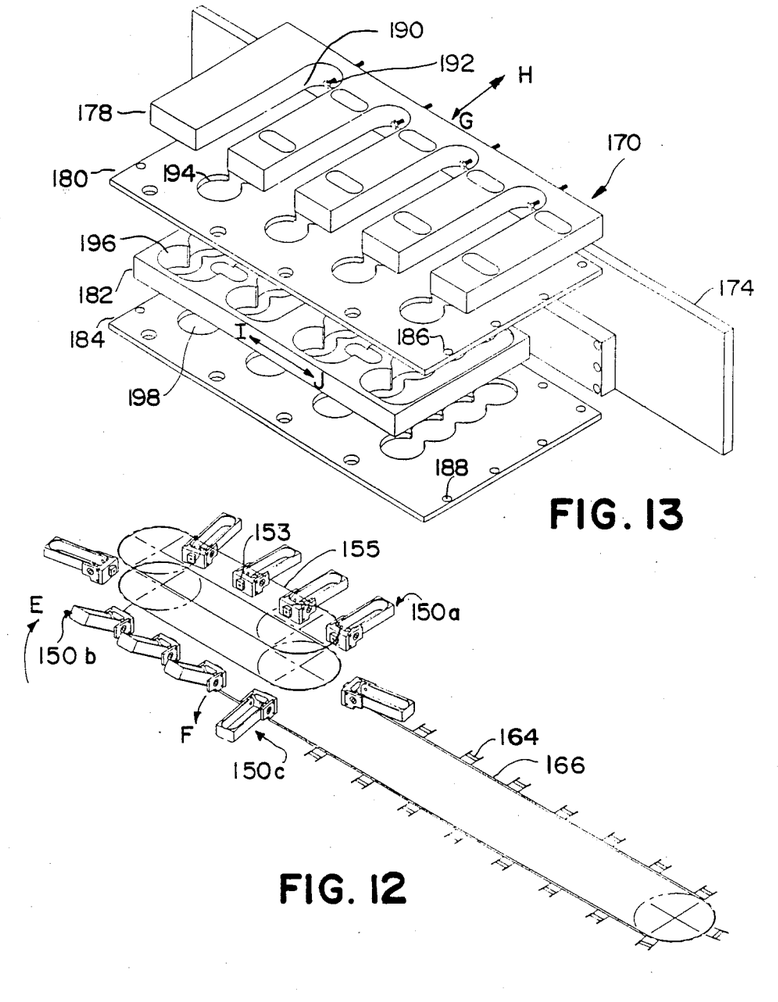
FIG. 12 schematically shows a plurality of the mandrels of FIG. 11 attached to a conveyor chain module.
FIG. 13 shows a loader which may be used in connection with the mandrel of FIG. 11 and the conveyor chain module of FIG. 12.

When the tray reaches position 150b, it is tipped up (direction E), about pivot points 158, 160, the balls roll out an opening at 162 (FIG. 11). Then, the mandrel tray 150 tips back down (direction F), pivoting an axis 158, 160 at position 150a (FIG. 12). The balls are deposited into boxes or cans (not shown) carried by mandrels 164 on an underlying conveyor chain module 166.

FIG. 13 is an exploded view which shows a ball loading device 170 that is positioned above the mandrels 150 of FIGS. 11, 12 and the boxes (not shown), but carried by mandrels 164 on a conveyor chain 166. Each loader 170 may serve the loading needs of up to four of the mandrels 150. The reason for the four tray loading is that golf is generally played in foursomes. Each player identifies his ball by one of the numbers 1, 2, 3, 4; therefore, there should be a box of balls carrying each number.

The loading device 170 has a support plate 174 which is secured to any suitable structure over four mandrels 150 of an automatic packaging machine. Attached to support plate 174 is an assembly of four layers, 178, 180, 182 184 which are bolted to a back plate 176. Also, bolts and spacers (not shown) fit through holes, such as 186, 188, to make a rigid structure.

Layer 178 has four elongated slots, such as 190. Each slot receives the golf balls from individually associated chutes that eventually dump into four mandrels 150 (FIGS. 11, 12). In the back of each slot 190 is a threaded bolt 192 which may be advanced or retracted to select and position the number of golf balls that are to be deposited in each box. Thus, if the screw 192 is advanced (direction G) as far as it can go, only two golf balls are required to fill the slot 190. If retracted (direction H) a full distance, slot 190 receives four golf balls. At an intermediate setting three golf balls fill the slot 190. Thus, the loading device may be adjusted to accommodate boxes of different sizes.

Each Of the three plates 180, 182, 184 have an elongated slot 194, 196, 198 under each of the elongated slots 190. The contours of these three slots 194-198 are such that the golf balls drop in desired positions along the length of a mandrel 150. The center plate 182 is adapted to reciprocally slide back and forth (directions I, J) as the balls are dropping, thus dislodging any ball which might otherwise be stuck in a slot.

Figure 14:
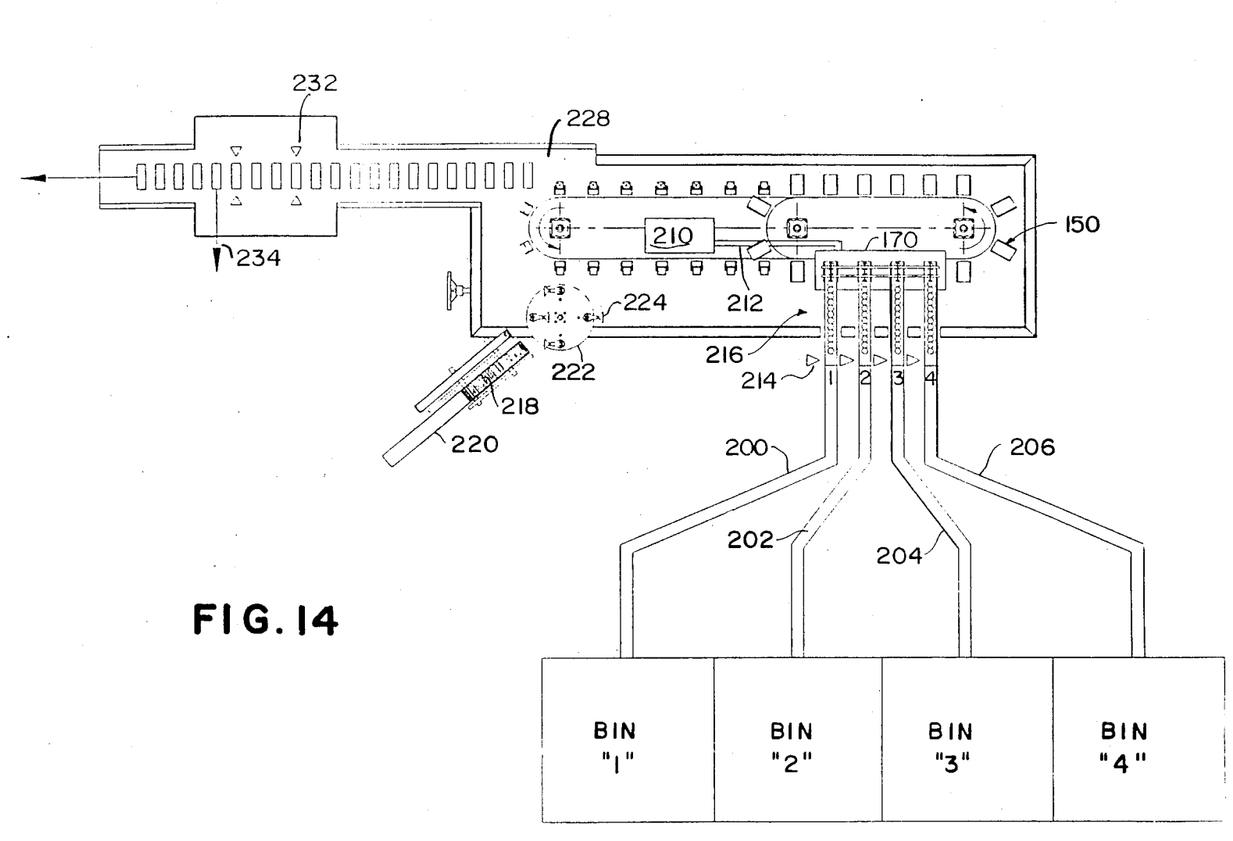
FIG. 14 schematically shows an exemplary automatic packaging machine incorporating the teachings of FIGS. 11–13.

FIG. 14 shows an automatic packaging machine using the structures of FIGS. 11-13. Four bins feed chutes 200, 202, 204, 206 with golf balls, the balls in each chute carrying a different number. For example, all balls in chute 200 have the number "1" imprinted on them. Chute 202 holds number "2" balls; chute 204 holds number "3" 1 balls; and chute 206 holds number "4" balls.

The four chutes lead from four bins to individually associated ones of the four slots 190 FIG. 13 in loader 170. A rotating cam device 210 (FIG. 14) reciprocally move layer 182 (FIG. 13) via a shaft 212. Associated with each of the chutes are sensors 214 for counting the balls being fed toward the loader and sensors 216 and for detecting levels at which less than a predetermined minimum number of balls are present. The machine shuts down at the minimum number to prevent a delivery of partly filled boxes.

For forming boxes, blanks 218 are fed through a magazine 220. A rotating platform 222 with four vacuum cups 224, pick up each blank 218 and feed it into a mandrel 225 on conveyor chain module 227. A sensor senses and confirms the presence of a box in each mandrel. If a box is not present, the loader is prevented from dumping balls into the non-existing box.

The filled boxes are deposited on an outgoing conveyor belt 228. As the boxes travel along conveyor 228, a sensor 230 detects empty cartons and a sensor 232 detects boxes with open flaps. If either detector responds, the defective carton is rejected by being pushed off the conveyor 228, as indicated by arrow 234. 5 FIGS. 15–18 give another example of how standard modules may be assembled to custom make an automatic loading machine. This example may use both vertical and horizontal chain modules somewhat similar to the layout shown in FIG. 7, for example.

Figure 15:
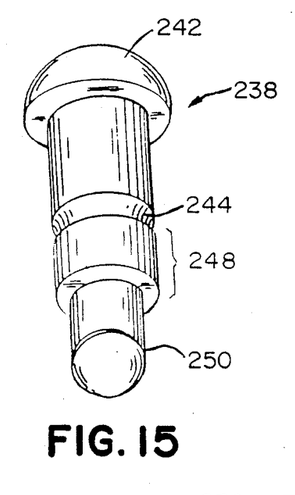
FIG. 15 is a perspective view of a two position, indexing cam pin that may be used in an automatic packaging machines to coordinate the positions of the moving mandrel and work stations as the mandrel travels along a conveyor chain module.
Figure 16:
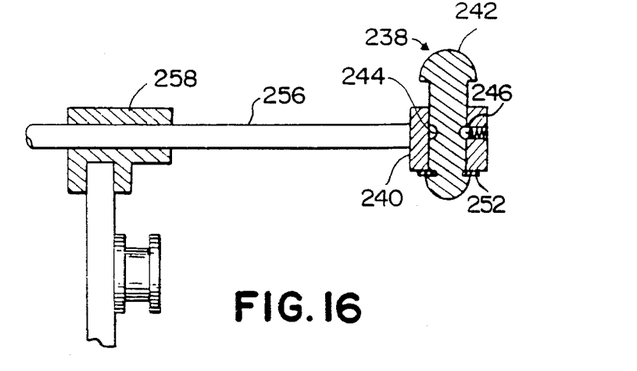
FIG. 16 shows the cam pin of FIG. 15 in an elevated position.
Figure 17:
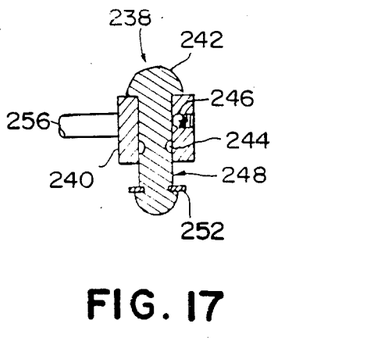
FIG. 17 shows the cam pin in a lowered position.

One of the key components which is used in this machine is a 20 diverter pin FIGS. 15–16 which is also shown in U.S. Pat. No. 4,856,566, granted Aug. 15, 1989.

In greater detail, FIG. 15 shows a two level, indexing cam pin 238 which is carried by a holder block 240 (FIG. 16). The top 242 of the cam pin 238 is a dome which may or may not encounter a downward deflecting surface depending upon the presence or absence of a box within a mandrel, for example. A groove 244 normally receives a spring loaded detent 246 in holder block 240 for holding the indexing cam pin 238 in a elevated position, as seen in FIG. 16. If pin 238 is lowered (FIG. 17), a cam surface 248 on it guides a transfer mechanism into a deflected position. If the pin is in the raised position shown in FIG. 16, the cam surface 248 is substantially within holder block 240 where it cannot deflect the transfer mechanism. A groove 250 (FIG. 5) receives and holds a retainer ring 252 (FIG. 6) which keeps the cam pin 238 from being removed from the holder block 240. When cam pin 238 is elevated, it follows a first path which, for example, pulls the transfer rod 256 to the right (as viewed in FIG. 16) in a slide bearing 258. When cam pin 238 is pushed down (FIG. 17), cam surface 248 pushes rods 256 to slide it to the left and through bearing 258.

Figure 18:
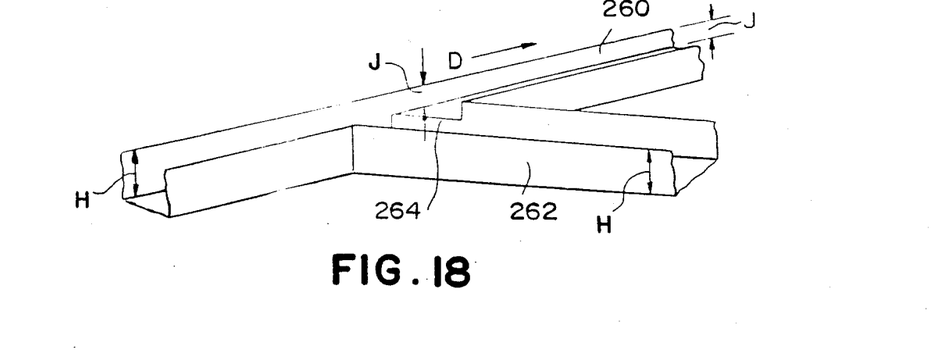
FIG. 18 shows part of a cam slot through which the cam pin of FIG. 15 may travel.

The arrangement for accomplishing this deflection or transfer function is seen in FIG. 18 which shows a cam slot 260 that is arranged to follow and parallel the conveyor chain. A second cam slot 262 diverges from the conveyor. Normally, the cam pins 238 are up; however, they are selectively pushed down (FIG. 17) by any suitable means when transfer rod is to be moved. The particular cam pin which is so pushed down is the one which is associated with a transfer rod which for any reason has been designated, as by a sensor, for example. When the cam pin 238 is in the elevated position (FIG. 16), so that the bottom of the cam pin passes over a transfer step 264. The lower tip end of the cam pin follows path 260 (FIG. 18). On the other hand, if the cam pin 238 is pushed down (FIG. 17), the cam surface 248 is deflected by cam step 264 into cam slot 262 (FIG. 18). This pushes the transfer rod 256 outwardly and moves a part on the automatic packaging machine.

U.S. Pat. No. 4,829,751 shows a mandrel which is supported on a slide bearing, the position of which may be controlled by transfer rod 256 (FIG. 16). That mandrel is used, as at 270, in FIG. 19. Also, the embodiment of FIG. 19 has product pusher rods 272 which may be the transfer rod 256 of FIG. 16.

Figure 19:
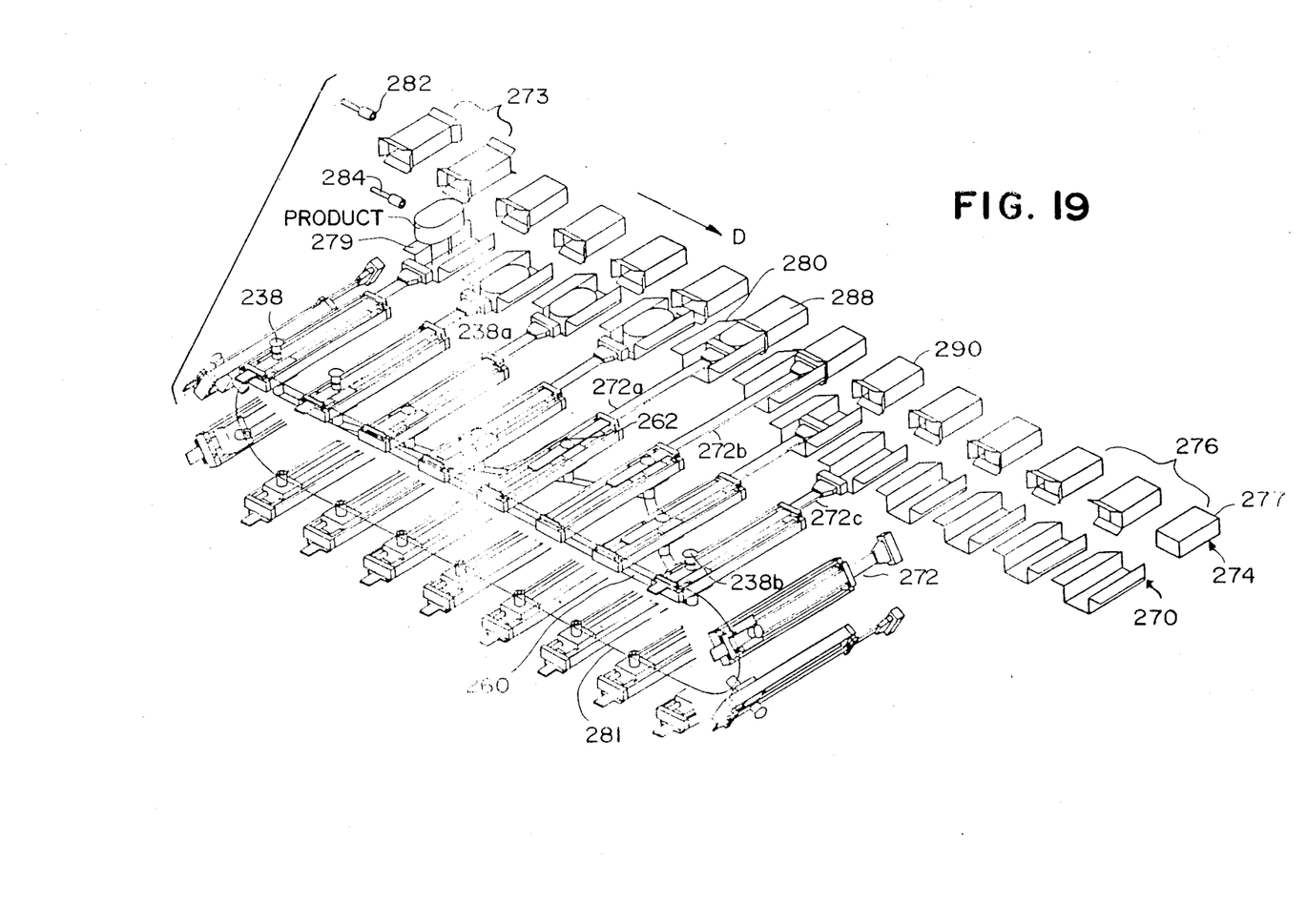
FIG. 19 is a schematic showing of a packaging system utilizing the principles of the indexing cam pin of FIGS. 15-18.

In FIG. 19, a first chain module (not shown) carries blanks 274 from a magazine to an output conveyor belt, neither of which are shown. The back end flaps of the boxes are closed in the area 273. The front end flaps are closed in the area 276. A filled and completely closed box is shown at 277.

Likewise a second chain module (not shown) carries a number of loading mandrels 270 which move back and forth between a product receiving position, as at 279, and a box loading position, as at 280.

A third chain module 281 carries a number of transfer rods 272. As here shown, the position of each transfer rod 272 is controlled by an individually associated cam pin 238. A first upstream sensor 282 detects whether a box is present or absent. A second up stream sensor 284 detects whether a product is present or absent. If either of the sensors 282 or 284 detects an absence of a box or product, there should be no loading; therefore, cam pin 238 is left in a raised position so that it travels down cam slot 260 and transfer rod 272 does not move.

If sensors 282 and 284 detect the presence of both the box and product, the corresponding transfer pin 238 is pushed down, as at 238a, to cause it to follow transfer cam slot 262. This causes the transfer rod 272(a) to move forward and to push the product into the associated box, as shown at 288. As the filled box 290 moves away from the fill position 288, the lowered cam pin 238 retracts the transfer rod 272(b). When the transfer rod 272c reaches its fully retracted position, the bottom of the cam slot raises to return the pin to its raised position, as shown at 238b.

The trays or mandrels 278 are not shown here in association with a cam pin, such as pin 238. However, it may be provided, if desired.

The advantages of the invention should now be clear. A plurality of standardized modules may be assembled in a customized manner in order to provide a unique machine. Since the modules are standardized a fairly uniform software program may be written to serve the various machines. With a uniform approach to software, the operators of the various machines may easily be able to interchangeable work on all machine.

Those who are skilled in the art will readily perceive how to modify the invention. Therefore, the appended claims are to be construed to cover all equivalent structures which fall within the true scope and spirit of the invention.

The claimed invention is:

1. An automatic packaging machine constructed of standardized modules assembled in a customized manner, said machine comprising a plurality of chain modules assembled in juxtaposition and with at least one of said chain modules confronting at least one other of said chain modules in at least one location where product carried by a conveyor chain module may be put into a box carried by another conveyor chain module, means for transferring driving power through said chain modules for operating them in a predetermined synchronism, a plurality of different types of mandrels for carrying different types of product and for performing transfer functions between said chain modules, and means for attaching a plurality of a selected type of mandrels to at least one of said chain modules.

2. The machine of claim 1 wherein each of said claim modules comprises at least one elongated plate having a sprocket wheel between said plates and at each end thereof, a link chain trained over said sprocket wheels, each of said sprocket wheels being mounted on and turning with a shaft extending perpendicularly with said plate, and said means for transferring power through said chain modules comprises means for interconnecting selected ones of said shafts, whereby all of said chain modules move in synchronism when power is applied to only one of said shafts.

3. The machine of claim 2 wherein said interconnecting means comprises a single shaft extending through a plurality of said chain modules.

4. The machine of claim 2 wherein said interconnecting means comprises gear means extending between selected ones of said shafts.

5. The machine of claim 2 wherein said interconnecting means comprises a link chain extending between selected ones of said shafts.

6. The machine of claim 2 and a plurality of connectors connected at periodical intervals along the length of a conveyor chain on at least one of said chain modules, and quick connect/disconnect means on each of said mandrels for attachment/detachment to said connectors.

7. The machine of claim 6 wherein one type of said mandrel has a somewhat wall-like member for attachment to said conveyor via said quick connect/disconnect tray means pivotally mounted on said wall-like member, means associated with said tray means for controlling the attitude thereof, and cam means extending along a length of said chain module for selectively moving said attitude controlling means for tipping said tray between product carrying and product dumping positions at locations along said length of chain which are marked by said cam means.

8. The machine of claim 7 wherein said wall-like member has a somewhat U-shape and said tray is pivotally mounted inside said U, said attitude controlling means being an actuator arm having a roller projecting therefrom for rolling along said cam means as a conveyor chain of said chain module moves said tray.

9. The machine of claim 7 wherein said tray is an elongated member which is shaped and dimensioned to carry a plurality of balls.

10. The machine of claim 9 wherein each selected one of said elongated members is adapted to carry individually identified balls.

11. The machine of claim 9 and loader means positioned over a plurality of said elongated members for simultaneously depositing product in each of said plurality of elongated tray members, said loader means having a separate loading station corresponding to each of said plurality of elongated tray members, and means individually associated with each of said plurality of elongated tray members for feeding product from separate sources to each of said loading stations whereby different products may be placed in each of a plurality of boxes.

12. The machine of claim 11 wherein said product is golf specific number on it.

13. The machine of claim 12 and means associated with each loading station for selecting a specific member of golf balls to drop into each box.

14. The machine of claim 11 wherein each of said loading stations comprises an elongated slot having a size and shape to receive up to four golf balls, means extending into each of said slots for effectively shortening said slots in order to adapt it to receive either two, three, or four golf balls.

15. The machine of claim 14 and four sources of golf balls, and a separate chute leading from each source of golf balls to a different one of four of said elongated slots, whereby all golf balls from any one of said sources are deposited in a corresponding one of said slots.

16. The machine of claim 1 wherein one of said chain modules carries boxes, a second of said chain modules carries mandrels for loading said boxes, a third of said chain modules carries transfer rods individually associated with said mandrels for pushing product from said mandrels into said boxes, a cam pin associated with each of said transfer rods, means for sensing the presence of each box and each product as it is carried by a conveyor chain of a chain module, means responsive to said sensor means for selectively moving said cam pin between two stable positions depending upon a presence or absence of a box or product at corresponding locations along said conveyor chain, and means responsive to the position of said cam pin for selectively activating or not activating said transfer rod in order to fill said boxes but only when both said box and said product are present.

17. An automatic packaging machine comprising a conveyor for transporting a plurality of elongated trays around a closed path, means for transporting a plurality of boxes around another closed path, said two closed paths coinciding over an area common to at least parts of said paths whereby product in said elongated trays may be dumped into said boxes in said area, loader means spanning an area which is long enough to simultaneously cover a plurality of said elongated trays, said loader means having a loading station corresponding to each elongated tray in said spanned area, means for feeding product from separate sources to each of said loading stations, means for transferring product from each loading station to a corresponding elongated tray, and means for dumping product from said elongated tray into an underlying box.

18. The machine of claim 17 wherein said elongated tray has a shape and size which adapts it to carry a plurality of golf balls.

19. The machine of claim 17 wherein each selected one of said elongated trays in said spanned area is adapted to carry individually identified golf balls.

20. The machine of claim 19 wherein each of said loading stations comprises an elongated slot having a size and shape for receiving up to four golf balls in a row, means extending into each of said slots for effectively shortening said slots in order to selectively adapt it to receive either two, three, or four golf balls.

21. The machine of claim 20 wherein said means for feeding product is four sources of golf balls, and a separate chute leading from each source of golf balls to a different one of four of said elongated slots, whereby all golf balls from any one of said sources are deposited in a corresponding one of said slots.

22. An automatic packaging machine comprising a plurality of conveyors for transporting items around closed paths, said closed paths coinciding in areas where items are transferred from one closed path to another closed path, transfer rods for accomplishing said transfer, a cam pin associated with each of said transfer rods, each of said cam pins having two stable positions, means associated with said closed paths for guiding and directing said cam pin to move into either of said two positions and means responsive to said cam pin moved into only one of said two positions for moving said transfer rod in order to transfer said item to said other closed path.

23. The machine of claim 22 wherein an item in one of said paths is a box and an item in another of said paths is a product, means for sensing the presence of each box and each product as it is carried along said paths, means responsive to said sensing means for selectively moving said cam pin between said two stable positions depending upon a presence or absence of a box or product at corresponding locations along said path, and means responsive to the positions of said cam pins for selectively activating or not activation said transfer rods in order to fill said boxes when both said box and said product are present.

* * * * *